(12) United States Patent
Shaffer et al.

(10) Patent No.: US 9,643,149 B2
(45) Date of Patent: May 9, 2017

(54) CROSS-LINKED CARBON NANOTUBE NETWORKS

(71) Applicants: The Bio Nano Centre Limited, London (GB); King Abdulaziz University, Jeddah (SA)

(72) Inventors: Milo Shaffer, London (GB); Garcia Gallastegui Ainara, London (GB); Abdullah Asiri, Jeddah (SA); Shaeel Althabaiti, Jeddah (SA)

(73) Assignees: The Bio Nano Centre Limited (GB); King Abdulaziz University (SA)

( * ) Notice: Subject to any disclaimer, the term of this patent is extended or adjusted under 35 U.S.C. 154(b) by 0 days.

(21) Appl. No.: 15/054,440

(22) Filed: Feb. 26, 2016

(65) Prior Publication Data

US 2016/0175799 A1 Jun. 23, 2016

Related U.S. Application Data

(62) Division of application No. 13/979,962, filed as application No. PCT/GB2011/052224 on Nov. 15, 2011, now Pat. No. 9,308,479.

(30) Foreign Application Priority Data

Jan. 17, 2011 (GB) .................................. 1100712.7

(51) Int. Cl.

| | | |
|---|---|---|
| *C07C 69/76* | (2006.01) |
| *B01J 13/00* | (2006.01) |
| *B01J 20/20* | (2006.01) |
| *B01J 20/28* | (2006.01) |
| *B82Y 40/00* | (2011.01) |
| *C01B 31/00* | (2006.01) |
| *C01B 31/02* | (2006.01) |
| *H01M 4/02* | (2006.01) |
| *H01M 4/66* | (2006.01) |
| *H01M 4/86* | (2006.01) |
| *H01M 4/88* | (2006.01) |
| *B01D 39/16* | (2006.01) |
| *B01J 31/02* | (2006.01) |
| *H01B 1/04* | (2006.01) |
| *B82Y 30/00* | (2011.01) |
| *H01B 1/12* | (2006.01) |
| *H01B 1/20* | (2006.01) |
| *C02F 1/28* | (2006.01) |

(52) U.S. Cl.

CPC ...... *B01J 13/0091* (2013.01); *B01D 39/1676* (2013.01); *B01J 20/205* (2013.01); *B01J 20/28011* (2013.01); *B01J 20/28047* (2013.01); *B01J 20/28057* (2013.01); *B01J 20/28078* (2013.01); *B01J 31/0232* (2013.01); *B82Y 30/00* (2013.01); *B82Y 40/00* (2013.01); *C01B 31/00* (2013.01); *C01B 31/0273* (2013.01); *C02F 1/285* (2013.01); *H01B 1/04* (2013.01); *H01B 1/12* (2013.01); *H01B 1/20* (2013.01); *H01M 4/02* (2013.01); *H01M 4/663* (2013.01); *H01M 4/8605* (2013.01); *H01M 4/8807* (2013.01); *C01P 2006/10* (2013.01); *C02F 1/283* (2013.01); *C02F 2305/08* (2013.01); *Y02E 60/50* (2013.01); *Y10S 977/746* (2013.01)

(58) Field of Classification Search

CPC . B01D 39/1676; B01J 13/0091; B01J 20/205; B01J 20/28011; B01J 20/28047; B01J 20/28057; B01J 20/28078; B01J 31/0232; B82Y 30/00; B82Y 40/00; C01B 31/00; C01B 31/0273; C01P 2006/10; C02F 1/283; C02F 1/285; C02F 2305/08; H01B 1/04; H01B 1/12; H01B 1/20; H01M 4/02; H01M 4/663; H01M 4/8605; H01M 4/8807; Y02E 60/50; Y10S 977/746

See application file for complete search history.

(56) References Cited

U.S. PATENT DOCUMENTS

| | | | |
|---|---|---|---|
| 2005/0064647 A1* | 3/2005 | Manabe .............. | B82Y 10/00 438/222 |
| 2010/0092371 A1 | 4/2010 | Backov et al. | |
| 2010/0187484 A1 | 7/2010 | Worsley et al. | |
| 2010/0190639 A1 | 7/2010 | Worsley et al. | |
| 2011/0224376 A1 | 9/2011 | Zhai et al. | |
| 2015/0122800 A1 | 5/2015 | Gallastegui et al. | |

FOREIGN PATENT DOCUMENTS

| | | |
|---|---|---|
| FR | 2910458 A1 | 6/2008 |
| WO | 2008034939 A1 | 3/2008 |

OTHER PUBLICATIONS

Worsley M A et al.: "Properties of single-walled carbon nanotube-based aerogels as a function of nanotube loading", ACTA Materialia, Elsevier, Oxford, GB, (200), 57:17, pp. 5131-5136.
Lui Chenyang et al.: "Gelation in Carbon nanotube/polymer composites" Science Direct Polymer 44 (2003) pp. 7529-7532.
Pekker, S. et al.: "Hydrogenation of Carbon Nanotubes and Graphite in Liquid Ammonia" J. Phys. Chem. B (2001) 105, pp. 7938-7943.
Bryning, Mateusz B., et al.: "Carbon Nanotube Aerogels", Advanced Materials, (2007) 19, pp. 661-664.
Fogden, Sian, et al.: "Purification of single walled carbon nanotubes: The problem with oxidation debris", Chemical Physics Lettrs (2008) 460 pp. 162-167.
Verdejo, Raquel, et al.: "Removal of oxidation debris from multi-walled carbon nanotubes", Chem. Commun., (2007) pp. 513-515.
Garcia-Gallastegui, Ainara et al.: "Reductive Functionalization of Single-Walled Carbon Nanotubes with Lithium Metal Catalyzed by Electron Carrier Additives", Chem. Mater, (2008) 20, pp. 4433-4438.

(Continued)

*Primary Examiner* — Yevegeny Valenrod
*Assistant Examiner* — Blaine G Doletski
(74) *Attorney, Agent, or Firm* — Lerner, David, Littenberg, Krumholz & Mentlik, LLP

(57) ABSTRACT

The present invention relates to a method for the production of cross-linked carbon nanotube network which are selected from aerogels and xerogels with improved performance and characteristics thereof. The invention is also concerned with carbon nanotube networks which are selected from aerogels and xerogels produced by such processes and uses thereof.

15 Claims, 1 Drawing Sheet

(56) References Cited

OTHER PUBLICATIONS

Wei, Liangming, et al.: "Covalent sidewall functionalization of single-walled carbon nanotubes via one-electron reduction of benzophenone by potassium", Science Direct, Chemical Physics Letters, (2007) 446, pp. 142-144.

Bergin, Shane D., et al.: "Towards Solutions of Single-Walled Carbon Nanotubes in Common Solvents", Advanced Materials, (2008) 20, pp. 1876-1881.

Chen, Y. et al.: "Chemical attachment of organic functional groups to single-walled carbon nanotube material", Journal of Materials Research, (1998) 13:9 pp. 2423-2431.

Penicaud, Alain, et al.: "Spontaneous Dissolution of a Single-Wall Carbon Nanotube Salt", J. Am. Chem. Soc. (2005) 127, pp. 8-9.

Ogino, Shinichi, et al.: "Relation of the Number of Cross-Links and Mechanical Properties of Multi-Walled Carbon Nanotube Films Formed by a Dehydration Condensation Reaction", J. Phys. Chem. B (2006) 11Q, pp. 23159-23163.

International Preliminary Report on Patentability for Application No. PCT/GB2011/052224 dated Jul. 17, 2013.

International Search Report for Application No. PCT/GB2011/052224 dated May 23, 2013.

\* cited by examiner

CROSS-LINKED CARBON NANOTUBE NETWORKS

CROSS-REFERENCE TO RELATED APPLICATION

The present application is a divisional of U.S. patent application Ser. No. 13/979,962, filed Sep. 10, 2013, now U.S. Pat. No. 9,308,479, which is a national phase entry under 35U.S.C. §371 of International Application No. PCT/GB2011/052224,filed Nov. 15, 2011 and published in English, which claims priority from Great Britain Patent Application No. 1100712.7, filed Jan. 17, 2011, the disclosures of which are incorporated herein by reference.

FIELD OF THE INVENTION

The present invention relates to a method for the production of cross-linked carbon nanotube networks, which are selected from aerogels and xerogels with improved performance and characteristics thereof. The invention is also concerned with carbon nanotube networks, which are selected from aerogels and xerogels produced by such processes and uses thereof.

BACKGROUND OF THE INVENTION

Xerogels and aerogels are highly porous materials with a particularly low envelope density and high surface area. They typically also display exceptionally low thermal conductivity and acoustic propagation properties. As such, they are useful in a wide range of applications including as purification/separation media, non-reflective panels, gas storage media, catalyst support, porous substrates e.g. sponges and electrochemical device electrodes (for supercapacitors, fuel cells and lithium ion batteries).

The most common examples are silica aerogels usually made by sol-gel processes and carbon hydrogels obtained from pyrolysis of resorcinol-formaldehyde resin.

Carbon nanotubes are a new form of carbon with an intrinsically high aspect ratio and nanoscale diameter. Individually, they have high strength, high modulus, useful electrical conductivity, and large surface area. Attempts to exploit these properties in macroscopic form depend on the development of appropriate processing techniques.

In recent years, a number of attempts have been made to prepare carbon nanotube-based aerogels. One such example includes the creation of carbon nanotube aerogels from aqueous-gel precursors by critical-point-drying and lyophilisation (freeze-drying) (Carbon Nanotube Aerogels, Byrning M. B., Wilkie D. E., Islam M. F., Hough L. A., Kikkawa J. M., Yodh A. G., *Adv. Mater.*, 2007, 19, 661). This method involves the use of polyvinyl alcohol (PVA) to reinforce the carbon nanotube aerogels. Although such reinforced nanotubes display improved strength and stability, the presence of PVA invariably results in several disadvantages including increased parasitic mass and reduced electrical conductivity.

There have also been reports of carbon aerogels, using nanotubes as additional filler (Properties of Single-Walled Carbon Nanotube-Based Aerogels as a Function of Nanotube Loading, Worsley M. A., Pauzauskie P. J., Kucheyev S. O., Zaug J. M., Hamza A. V., Satcher Jr. J. ft, Baumann T. F., *Acta Materialia*, 2009, 57, 5131). Although this method provides carbon aerogel composite foams with improved electrical properties, these foams suffer from large volumetric shrinkage during the drying and carbonisation steps, unless over 20 wt % of single-walled carbon nanotubes is present in the foams.

Furthermore, synthesis of cross-linked multi-walled carbon nanotube films has been previously reported (Relation of the Number of Cross-Links and Mechanical Properties of Multi-Walled Carbon Nanotube Films Formed by a Dehydration Condensation Reaction, Ogino S., Sato Y., Yamamoto G, Sasamori K., Kimura H., Hashida T., Motorniya K., Jeyadevan B., Tohji K., *J. Phys. Chem.*, 2006, 110, 23159). However this method requires filtration of the nanotubes to form a dense film before cross-linking. Since the resultant cross-linked film is not a carbon aerogel, the film is less porous and has a much greater density than is desirable.

Physical gels of carbon nanotubes are known in solvents, caused by entanglement or weak non-covalent association; however, these gel networks are not robust, have low strength, and collapse in the absence of solvent (Gelation in Carbon Nanotube/Polymer Composites, Liu C. et al., *Polymer*, 2003, 44, 7529-7532).

Therefore, the present invention seeks to provide a method of obtaining cross-linked carbon nanotube networks, which are selected from aerogels and xerogels, which overcome the above-mentioned problems. The present invention also seeks to provide cross-linked carbon nanotube networks which are selected from aerogels and xerogels which allow more control over the density, shape, conductivity and internal surface of the nanotubes, so that they display desirable electrical and mechanical properties.

SUMMARY OF THE INVENTION

According to a first aspect of the present invention, there is provided a method of producing a carbon nanotube network which is selected from an aerogel and a xerogel comprising the steps of: (a) dispersing carbon nanotubes in a solvent compatible with said carbon nanotubes; (b) cross-linking said carbon nanotubes using functional groups already present on the carbon nanotubes or with a linking molecule comprising at least two functional sites capable of reacting with the surface of said carbon nanotubes, to form a covalently cross-linked gel network; and (c) removing said solvent to give a cross-linked carbon nanotube network which is selected from an aerogel and a xerogel with a solvent content of less than 10% by weight.

Preferably, the solvent content of the cross-linked carbon nanotube network which is selected from an aerogel and a xerogel is less than 2% by weight, more preferably less than 0.5% by weight, more preferably less than 0.1% by weight.

The term carbon nanotubes according to the present invention refers to nano-scale tubes made substantially of carbon atoms, having a structure based on graphite basal planes that are wrapped or curled to become a tube. The definition therefore encompasses carbon nanotubes of any type, including common carbon nanotubes, variants of common carbon nanotubes, and carbon nanotubes with various modifications. In this respect, the term encompasses those that are not exactly shaped like a tube, such as a carbon nanotube (a horn-shaped carbon nanotube whose diameter continuously increases from one end toward the other end); a carbon nanocoil (a coil-shaped carbon nanotube, forming a spiral when viewed in entirety); a carbon nanobead (a spherical bead made of amorphous carbon or the like with its centre pierced by a tube) and a cup-stacked nanotube. It may also encompass structures that are not pure carbon, such as those doped with nitrogen or boron, or functionalised with surface groups such as those containing oxygen, hydrogen, or other derivatives. Carbon nanotubes may further be submicron fibres with primarily graphitic ($sp^2$) or amorphous carbon structures arranged in any crystallographic orientation such as platelet nanofibres and bamboo nanofibres. Preferably, the present invention uses common carbon nanotubes in which the carbon atoms are ideally $sp^2$ bonded into a graphene-like sheet with cylindrical geometry. Suitable nanotubes may be those that are commercially available such as the products of Applied Sciences Inc., Bayer Chemicals, Cheaptubes Inc., Chengdu Organic Chemicals, Future Carbon, Nanocyl S. A., Nanoshel, Arry International Group Limited, Carbon Nano Materials R&D Center, Carbon Solutions Inc., NanocarbLab (NCL). Nanocs, Thomas Swan Ltd.

Moreover, for the purposes of the present invention, carbon nanotubes may be single-walled carbon nanotubes, double-walled carbon nanotubes or multi-walled carbon nanotubes having more than two layers. For example, the nanotubes used in the present invention preferably have 5 to 15 walls. Whether one or more types of carbon nanotube are used (and, if only one type is to be used, which type is chosen) is selected appropriately taking into consideration the particular end use. For example, carbon nanotubes with a smaller diameter favour larger surface area and those with a larger diameter display greater resistance to collapse during drying of the gel network. Most applications might benefit from high surface area, but it is particularly desirable, for example, in the case of supercapacitor electrodes, whereas a somewhat lower surface area but greater robustness might be more suitable for a catalyst support In a preferred method according to the present invention, the carbon nanotubes are multi-wailed carbon nanotubes having more than two layers. Preferably, greater than 75 wt % of the nanotubes in the network have more than two layers.

Preferably, the carbon nanotubes used in the present invention, such as multi-walled carbon nanotubes, have a diameter range of from about 0.5 to 100 nm, preferably from about 10 to 30 nm, more preferably about 10 to 15 nm. Preferably, the carbon nanotubes used in the present invention, such as multi-walled carbon nanotubes, have a length of from about 0.05 to 1000 μm, preferably from about 0.1 to 30 μm, most preferably in the range of about 0.1 to 10 μm. Preferably, greater than 75 wt % of the nanotubes in the network have dimensions in the ranges set out immediately above.

The carbon nanotubes according to the present invention are reacted using functional groups already present on the carbon nanotubes or with a linking molecule comprising at least two functional sites capable of reacting with the surface of said carbon nanotubes, to form a covalently cross-linked gel network.

According to one embodiment of the present invention, the linking molecule may have functionalities that can couple directly to the nanotube sidewall. For example, bis(diazonium) salts, or multifunctional molecules suitable for 1,3-dipolar cycloadditions, or Bingel condensations using known nanotube surface chemistry. More generally, radical addition, electrophile addition or cycloaddition, or all the reactions involving the reduction of the carbon nanotubes followed by the reaction of the nanotubes with an electrophilic cross-linking molecule. Such reductions may be carried out by Birch reduction (Chemical Attachment of Organic Functional Groups to Single-Walled Carbon Nanotube Material, Chen Y., Haddon R. C., Fang S., Rao A. M., Eklund P. C., Lee W. H., Dickey E. C., Grulke E. A., Pendergrass J, C., Chavan A., Haley B. E., Smalley R. E., *J. Mater. Res.*, 1998, 13, 2423; Hydrogenation of Carbon Nanotubes and Graphite in Liquid Ammonia, Pekker, S., Salvetat J.-P., Jakab E., Bonard J.-M., ForróL. J., *Phys. Chem. B,* 2001, 105, 7938). Carbon nanotube reduction may be also carried out using alkali metals and the radical anions generated from naphthalene (Spontaneous Dissolution of a Single-Wall Carbon Nanotube Salt, Penicaud A., Poulin P., Derre A., Anglaret E., Petit P., *J. Am. Chem. Soc.,* 2005, 127, 8) or benzophenone (Covalent Sidewall Functionalization of Single-Walled Carbon Nanotubes via One-Electron Reduction of Benzophenone by Potassium, Wei L. Zhang Y., *Chem. Phys. Lett.,* 2067, 446, 142) or using catalytic amounts of 4,4'-di-tert-butylbiphenyl (DTBP) that act as electron carrier to promote the formation of carbanionic nanotubes (Reductive Functionalization of Single-Walled Carbon Nanotubes with Lithium Metal Catalyzed by Electron Carrier Additives, Garcia-Galiastegui A., Obieta Buster I., Imbuluzqueta G., Arbiol J, Miranda J. I., Aizpurua J. M., *Chem. Mater.,* 2008, 20, 4433) followed by reaction with organic dihalides, organo silyl dihalides, vinyl monomers or in general any electrophile molecule that can react with the carbanionic sites of the nanotubes and act as a cross-linker between them.

Direct coupling to the sidewalls, avoids the necessity for damaging pre-oxidation steps. By avoiding unstable linking groups, a more thermally and chemically stable framework can be produced, of greater versatility in application, for example, by creating an aerogel linked by only carbon-carbon bonds. Direct coupling is particularly amenable to creating conjugated linking systems that aid electrical conductivity. In addition, some direct chemistries, such as alkylation following the reductive charging in Birch reactions, are particularly helpful for improving the dispersion of the carbon nanotubes to form a good gel and hence a homogeneous aerogel.

Alternatively, according to a preferred embodiment, such a linking molecule may react with oxide groups of oxidised carbon nanotubes to produce, for example, ester, ether, or amide linkages. Suitable cross-linking agents, include alkyl diamines, aromatic diamines, alkyl diols, aromatic dials, polyols, bis-sodium alkoxides, dicarboxylic acids, di acid chlorides, di siloxane halides, di siloxane alkoxides, preferably $C_{1-20}$ alkyl diamines, $C_{5-24}$ aromatic diamines, $C_{1-20}$ alkyl diols, $C_{5-20}$ aromatic diols, $C_{2-100}$ polyols, bis-sodium $C_{1-20}$ alkoxides, $C_{2-20}$ dicarboxylic acids. $C_{2-20}$ di acid chlorides, more preferably $C_{1-10}$ alkyl diamines, $C_{6-18}$ aromatic diamines, $C_{2-10}$ alkyl diols, $C_{6-18}$ aromatic dials, $C_{2-20}$ polyols, bis-sodium $C_{2-10}$ alkoxides, $C_{2-10}$ dicarboxylic acids, $C_{2-10}$ di acid chlorides, and the like. Preferably, the two reactive groups are located on different atoms of the linking molecule, more preferably at some distance, to maximise the chance of reacting with two different nanotubes. The use of small rigid molecules may maximise the chance of establishing a cross-link, for example using 1,4-diamino benzene, by limiting the possibility of reacting twice with the same nanotube.

In an alternative, preferred embodiment, the oxidised carbon nanotubes according to the present invention are cross-linked using any linking groups which are capable of forming covalent bonds by direct reaction between the oxides on the nanotube surface. In this case, there is no additional linking molecule interposed between the nanotubes; the covalent bond forms directly by condensation between the existing oxide groups. This approach has the advantage of bringing the nanotubes into close contact, maximising the electrical conductivity of the junction, and minimising both the additional reagents required and subsequent parasitic mass added to the network. It is worth noting that, in the previous embodiment, the additional linking molecules will saturate the entire surface, although nanotube cross-links will only occur relatively rarely. These molecules may be wasteful and may, undesirably, occlude the conductive surface that is desirable in certain applications such as electrochemical electrodes. Direct condensation between the existing surface oxides occurs only at the contact points between the nanotubes, leaving the remaining surface unchanged, or available for subsequent differential functionalisation.

As disclosed previously, the preferred embodiments according to the present invention may involve the use of oxidised carbon nanotubes which may be obtained commercially or, more usually, be those that have further been oxidised according to any standard method. The term "oxidised carbon nanotubes" as used herein refers to any carbon nanotube with one or more oxide groups present on the surface of the carbon nanotube. A wide range of surface oxides are known in carbon chemistry, including quinones, ketones, lactones, pyrones, carboxylic acids, carboxylates, hydroxides and hydroxyl groups etc., and groups derivable from these via oxidation. In a particularly preferred embodiment, the surface oxides are carboxylic and/or hydroxide groups. The oxides may be produced during the original synthesis reaction, or be deliberately introduced in a subsequent step, involving liquid or gas phase oxidation. Gas phase oxidation can be carried out at elevated temperature in any suitable oxidising gas, such as air, oxygen, water vapour, carbon monoxide, or carbon dioxide; the temperature depends on the gas and is typically in the range 250° C. to 800° C.

In a preferred method, the oxidised carbon nanotubes are prepared using a system of mixed acids or oxidising agents, preferably being selected from the group consisting of $H_2SO_4$, $HNO_3$, $H_2O_2$, $KMnO_4$, $K_2Cr_2O_7$, $OsO_4$, and $RuO_4$. In a particularly preferred method, the mixed acid system is a combination of sulphuric and nitric acid.

The level of oxidation of the carbon nanotubes will vary according to the desired mechanical and electrical properties required. Typically, the level of oxidation on the oxidised carbon nanotubes is between 0.001-10 mmol/g, preferably 0.1 mmol/g or greater.

In a preferred embodiment of the present invention, the oxidised carbon nanotubes are base-washed before the cross-linking step. Such 'base-washing' may be an important step to expose oxidation 'debris' and to expose groups directly bound to the nanotubes, such that the nanotubes are covalently connected during the cross-linking step. Removal methods for such debris are disclosed in Purification of Single Walled Carbon Nanotubes: The Problem with Oxidation Debris, Fogden S., Verdejo R., Cottam B., Shaffer M., Chem, Phys. Lett., 2008, 460, 162-167; Removal of Oxidation Debris from Multi-Walled Carbon Nanotubes, Verdejo R., Lamoriniere S., Cottam B., Bismarck A., Shaffer M., Chem. Common 2006, 513-515. In a preferred embodiment, base washing is carried out using weak aqueous base, more preferably a weak aqueous solution of sodium hydroxide or potassium hydroxide.

In a preferred method, the oxidised carbon nanotubes are cross-linked to form an ester or ether bond, most preferably an ester bond. The reaction is preferably a condensation reaction, one that releases a small molecule byproduct such as water, rather than introducing additional atoms into the resulting linkage. In yet another embodiment, the surface oxides may be converted to other simple functional groups for direct condensation. In such an embodiment, the surface alcohols on the carbon nanotubes may be converted to, for example, an amine functionality, which subsequently allows the cross-links to be formed via an amide bond. Other direct molecular condensations such as those to form imines, thioethers, thioesters, and ureas, also fall within the scope of the present invention.

In a preferred embodiment, the cross-links between the oxidised carbon nanotubes may be formed using a coupling agent. The term "coupling agent" as used herein does not have the conventional meaning often used in polymer resin chemistry but refers to any substance capable of facilitating the formation of a bonding link between two reagents, as in the field of organic chemistry. Such compounds include N,N'-dicyclohexylcarbodlimide (DCG), NN-diisopropyloarbodiimide (DIC), ethyl-(N',N'-dimethylamino)propylcarbodiimide hydrochloride (EDC) [adding an equivalent of 1-hydroxybenzotriazole (HOBt) to minimize the racemisation], 4-(N,N-dimethylamino) pyridine (DMAP), (benzotriazel-1-yloxy)tris(dimethylamino)phosphonlum hexafluorophosphate (BOP), (benzotriazol-1-yloxy)tripyrrolidinophosphonium hexafluorophosphate, bromotripyrrolidinophosphonium hexafluorophosphate, O-(benzotriazol-1yl)-N,N,N',N'-tetramethyluronium hexafluorophosphate (HBTU), O-(benzotriazol-1-yl)-N,N,N',N'-tetramethyluronium tetrafluoroborate (TBTU), O-(7-azabenzotriazol-1-yl)-N,N,N',N'-tetramethyluronium hexafluorophosphate (HATU), O-(6-chlorobenzotriazol-1-yl)-N,N,N',N'-tetramethyluronium hexafluorophosphate (HCTU), O-(3,4-dihydro-4-oxo-1,2,3-benzotriazine-3-yl)-N,N,N',N' tetrarnethyluronium tetrafluoroborate (TDBTU), 3-(diethylphosphoryloxy)-1,2,3 benzotriazin-4(3H)-one (DEPBT), carbonyldilmidazole (CDI) and mixtures thereof.

In a preferred embodiment, a carbodiimide is used to couple a suitable functional group and a carbonyl group such as an ester or an acid. Preferred examples of carbodlimides include but are not limited to 1-ethyl-3-(3-dimethylamino-propyl)carbodiimide, N,N'-dicyclohexyl carbodiimide, N,N'-diisopropyl carbodiimide, bisitrimethylsilyl)carbodiimide and N-cyclohexyl-N'-(β-[N-methylmorpholino]ethyl) carbodiimide p-toluenesulfonate. In a particularly preferred embodiment, the coupling agent is selected from the group consisting of N,N'-dicyclohexylcarbodilmide, N,N'-diisopropylcarbodiimide and 1-ethyl-3-(3-dimethylaminopropyl) carbodiimide.

The coupline agent may be supplemented by an additional agent such as those known to enhance extra selectivity or yield of such condensation reactions, such as N-hydroxybenzotriazole N-hydroxysuccinimide.

The cross-linking process may be carried out at any reasonable temperature and left for any length of time necessary to complete the reaction, so long as the reaction is carried out at a temperature below the boiling point of the reaction solvent(s). In a preferred method, the reaction is carried out at a temperature of between 15 to 60° C., preferably 20 to 30° C. The reaction time is preferably between 0.1 to 50 hours and more preferably between 1 and 12 hours.

Alternatively, the cross-linking process may be carried out by dehydration. The term dehydration as used herein refers to a chemical reaction which involves the loss of water from the reacting molecule(s). In a preferred embodiment, dehydration is carried out by using groups on the carbon nanotubes that are available directiy from synthesis or conventional purification regimes. Such groups include ether linkages which maybe formed by dehydration at a temperature greater than 120° C., preferably greater than 130° C. and even more preferably greater than 150° C., using an acid catalyst. Cross-linking process will require a solvent with a high boiling point, greater than the reaction temperature. In a preferred embodiment, the boiling point of the solvent is greater than 120° C., preferably greater than 130° C. and even more preferably greater than 150° C.

During the course of the reaction, the carbon nanotubes are cross-linked to form a gel phase. As used herein, the term "gel" refers to what those skilled in the art understand by the term, and preferably refers to a composition which retains its shape during the drying process. The gel phase is formed by a continuous network of covalently bound nanotubes within the solvent. Under small shear deformations the response is predominantly elastic rather than viscous; in dynamic shear rheology experiments, at the gel point there is a characteristic crossover of G' and G"/tan(nπ/2) given by the equation below:

$$G'(\omega)=G''(\omega)/\tan(n\pi/2)=S_g\omega^n\Gamma(1-n)\cos(n\pi/2)$$

where G' is the storage modulus, G" is the loss modulus, Γ is the gamma function, n is the relaxation exponent, $S_g$ is the gel strength and ω is the frequency. Using the values of G' at crossover points and the equation described before the $S_g$ value can be estimated, characteristic of the synthesised gel (Gelation in Carbon Nanotube/Polymer Composites, Liu C. et al., *Polymer,* 44, 2003, 7529-7532). By carrying out the process of covalent cross-linking in a gel phase, the resultant carbon nanotubes can retain their structural integrity during the removal of the solvent. During subsequent steps, it is possible to minimise the effects of the meniscus associated with liquid-phase drying such that the mesopores within the gel structure can be prevented from collapsing, allowing for a cross-linked carbon nanotube network which is selected from an aerogel and a xerogel with high porosity and large surface area.

In the case where cross-linking is carried out by direct reaction between the oxides on the nanotube surface, only a small proportion (approximately 1-3%) of the surface oxides react to form the cross-links between the carbon nanotubes. The cross-linked carbon nanotube network thus obtained will have unreacted oxide groups on the surface of the carbon nanotubes, These groups impart hydrophilicity (i.e. tendency to interact with or be dissolved by water and other polar substances) to the resulting carbon nanotube network which is selected from an aerogel and a xerogel.

However, in the case that a hydrophobic surface (one that repels water, and interacts with or dissolves in non-polar or neutral media) is required on the carbon nanotube, the method can further comprise a step of capping residual surface oxides on the oxidised carbon nanotubes prior to the removal of the solvent. Preferably, capping takes place after step (b) of the process and before step (c). The term "capping" according to the present invention refers to any step which alters or transforms the surface oxides into other functionalities. In this respect, it can be any functional group which is able to react with the surface oxide group such as a metal, haloalkanes acid halides and the like. In a preferred embodiment, the surface oxides are capped using a hydrophobic functional group. In a particularly preferred embodiment, the hydrophobic functional group is preferably selected from the group consisting of haloalkyl, alkyl and siloxane, more preferably $C_{1-12}$ haloalkyl and $C_{1-18}$ alkyl, most preferably a $C_{1-12}$ haloalkyl and more preferably $C_{1-10}$ haloalkyl. Preferably the hydrophobic functional group is a haloalkyl containing more than 1 fluorine atom, preferably 3 to 20 fluorine atoms, preferably 8 to 16 fluorine atoms, more preferably 10 to 14 fluorine atoms, for example 13 fluorine atoms. Preferably the capping group reagent is a hydroxyhaloalkyl compound, preferably a $C_{1-12}$ hydroxyhaloalkyl compound, preferably trifluoroethanol. By hydrophobic, it is meant that the group imparts increased hydrophobic character to the carbon nanotube, thereby reducing the solid surface tension.

Where a linking molecule is used to form the cross-links, although only a small proportion of the carbon surface is involved with cross-linking, unlike the direct condensation reactions, the remaining surface will already be saturated with excess linking molecules. Since, both sides are saturated, these molecules are unlikely to covalently cross-link during drying (depending on the reagent), but may well be relatively polar and form undesirable non-covalent interactions that encourage collapse. In this case a further reaction with a capping agent, as described above, could be used to lower the surface tension, where the hydrophobic end group is reacted with the remaining unreacted end of the excess linking molecules.

In the method according to the present invention, a solvent which is compatible with the carbon nanotubes may be used (Towards Solutions of Single Walled Carbon Nanotubes in Common Solvents. Bergin S. D., Nicolosi V., Streich P. 3, Giorciani S., Sun Z. 1, Windle A. H. 4, Ryan P. 5, Nirmairaj P. P. N. 5, Wang Z, T. 4, Carpenter L., Blau W, J., Boland J. J. 4, Hamilton J.P. 3, Coleman J. N., Advanced Materials, 2008, 20, 10, 1876). In this respect, the term "compatible" refers to any solvent in which the carbon nanotubes form a substantially homogeneous solution or dispersion. Preferably, the solvent which is compatible with the carbon nanotubes is miscible therewith. Preferably, the coupling agent is also substantially soluble in the solvent. In a preferred embodiment, the solvent is selected from dimethyl formamide, benzene, dichloromethane, chlorobenzene, chloroform, toluene, xylene, dioxane, dimethylsulfoxide, tetrahydrofuran, amide solvents and mixtures thereof, most preferably dimethyl formamide. As used herein amide solvents refers to any solvent which contains an amide group. Preferred amide solvents includes N-methyl-2-pyrrolidone and cyclohexyl pyrrolidone.

The carbon nanotubes may be present in the solvent at any given concentration. Preferably, the nanotubes must be sufficiently concentrated that they can form a continuous connected network across the whole composition. Preferably, this concentration is above the rheological percolation threshold for the chosen nanotubes dispersion in the chosen solvent. In a preferred method, the carbon nanotubes are present in the solvent at a concentration of between 0.01-30 vol. %, more preferably 0.1-20 vol. %, more preferably 1-5 vol. %.

In a further preferred method according to the present invention, the removal of solvent is carried out by solvent exchange with at least one solvent having lower surface tension than the initial solvent. The term "surface tension," as used herein, refers to the attractive force in any liquid exerted by the molecules below the surface upon those at the surface/air interface, which force tends to restrain a liquid from flowing. Preferably, the term "low surface tension," as used herein refers to liquids having a surface tension of less than or equal to about 30 mN/m as measured at 25° C. and atmospheric pressure. However, this value may be more or less, since the critical tolerable surface tension to avoid collapse during the drying step will depend on the network. In particular, as any one of the nanotube diameter, the cross-link density, or degree of hydrophobisation increases, the need for low surface tension decreases. Therefore in principle, some nanotube gels may be dried without solvent exchange and others will need very low surface tensions. Whether a particular network requires such solvent exchange will depend on the individual properties of the gels. The lower density, higher surface area networks have more desirable properties but tend to be less robust so need solvent exchange or other controlled drying technique. In a particularly preferred embodiment, solvent exchange is carried out using acetone, followed by $C_3$-$C_{10}$ hydrocarbon, preferably hexane.

The carbon nanotube network according to the present invention is an aerogel xerogel, most preferably an aerogel.

As used herein, the term "aerogel" refers to a highly porous material of low density, which is prepared by forming a gel and then removing liquid from the gel while substantially retaining the gel structure. Preferably, an "aerogel" according to the present invention comprises a carbon nanotube network wherein the volume change on drying of the gel is less than 30%, preferably less than 20%, preferably less than 10%, preferably less than 5%. Aerogels have open-celled microporous or meseporous structures. Typically, they have pore sizes of less than 1000 nm and surface areas of greater than 100 $m^2$ per gram. Preferably they have pore sizes of less than 200 nm and surface areas of greater than 400 $m^2$ per gram. They often have low densities, e.g., from 500 mg/$cm^3$ down to as little as 1 mg/$cm^3$, preferably in the range of 15 to 300 mg/$cm^3$. Exceptionally, unlike other existing aerogels, those produced from high aspect ratio nanotubes, may have low densities, high surface areas, but large pore sizes; in principle, the pore size may approach the scale of the individual nanotube lengths which can reach millimetres or even centimetres.

Preferably, aerogels are materials in which the liquid has been removed from the gel under supercritical conditions. In one method according to the present invention, removal of solvent may carried out by supercritical drying or lyophilisation to form an aerogel. The most common method for supercritical drying involves the removal of the solvent with supercritical carbon dioxide, and this may be used in the present invention.

In a preferred method according to the present invention, the drying process is carried out at room temperature and/or ambient pressure. This method is a more versatile procedure to fabricate an aerogel since it does not require supercritical $CO_2$, or a freezing-vacuum process. The aerogel can be obtained by simply drying the gel. The objective is to evaporate the solvent producing the minimum volume reduction when obtaining the aerogel from the gel. The cross-linking between the nanotubes and the optional hydrophobic functionalisation of the nanotube surface help this process. Moreover, we propose a solvent exchange process to a solvent with lower surface tension. The functionalisation during the preparation of the gel permits us to simplify the later drying step.

The term "xerogel" as used herein refers to a type of aerogel in which the volume change on drying of the gel is greater than approximately 30%. In this case, although the gel partially collapses during drying, the strong covalent network of nanotubes limits the process, yielding a more useful, more porous, less dense structure, than obtained from drying physical gels or other nanotube suspensions.

The pores in the aerogels used in the present invention are typically filled with air. They can also be filled with other desired gases. Alternatively, the gases can be removed from the aerogel under vacuum.

Aerogels prepared according to the present invention allow the gel to be cast in predetermined shapes, for example as particles, to match the desired final aerogel particle size and shape. The idea is to control the final shape by controlling the shape in the gel phase. The present method also allows for the formation of a large gel to form a large aerogel. In this way, the large aerogel can be broken or otherwise processed into particles of the desired size. The aerogel may also be formed into particles such as beads or pellets (typical diameters in the mm range) which may be used as a catalyst support, or as films/sheets for use as filters.

It is desirable that the resultant carbon nanotube networks contain as few impurities as possible. Such impurities include residual reagents (e.g. coupling agents), surfactants, additives, polymer binders and the like. This term however does not encompass any modification groups such as fluoroalkyl species that have subsequently been deliberately added to the carbon nanotube network. The presence of these impurities can lead to an increase in the density of the carbon nanotube networks as well as reducing the electrical conductivity and surface area of the carbon nanotube aerogel. In the current invention, excess or exhausted small molecule coupling agents are easily removed during the solvent exchange process.

Since the method according to the present invention does not require the use of a substantial amount of such additives or reagents which are often hard to remove, carbon nanotube networks which are selected from aerogels and xerogels with high electrical conductivity, large surface area and low density can be obtained. In a preferred embodiment, the total amount of impurities present in the carbon nanotube network which is selected from an aerogel and a xerogel is less than 5 wt. %, and even more preferably less than 1 wt. %. This condition is particularly so at the point that the solvent has been removed, and prior to any subsequent modification of the network (aerogel or xerogel) required to produce a final material having a specific In a preferred embodiment, the aerogel network is based around carbon nanotubes with aspect ratio of between 100 and 10000, preferably with aspect ratio of between 200 and 1000. By aspect ratio is meant the ratio between the length and diameter of the carbon nanotubes. Typically, carbon nanotubes have a high aspect ratio since the length of carbon nanotubes is typically in the order of 1-100 μm, Preferably, each carbon nanotube used in the present invention has high electric conductivity and allows a current flow at a current density of greater than 10 MA/$cm^2$, preferably greater than 100 MA/$cm^2$ or more. A network of carbon nanotubes is therefore thought to display excellent electrical conductivity and current density, compared to existing carbon aerogels.

In addition, carbon nanotubes have desirable intrinsic mechanical characteristics, including high strength, stiffness, and flexibility, at low density. These properties make carbon nanotubes desirable for many industrial applications, and lend desirable properties to the resulting aerogel networks.

The shape of the aerogel or xerogel can be controlled by controlling the shape of the vessel used during the gelation step. The density of the final aerogel can be controlled by varying the volume fraction of nanotubes within the initial gel.

In preferred embodiments, there are provided catalysts, catalyst supports, non-reflective panels, absorbents, filter materials, gas adsoption media, water purification media, substrates for cell growth and differentiation and electrochemical device electrodes comprising a carbon nanotube network which is selected from an aerogel and a xerogel prepared using the present method.

BRIEF DESCRIPTION OF THE DRAWINGS

The FIGURE is a representation of cylindrically-shaped carbon nanotube gels in n-hexane.

DETAILED DESCRIPTION OF THE INVENTION

General

The term "comprising" encompasses "including" as well as "consisting" e.g. a composition "comprising" X may consist exclusively of X or may include something additional e.g. X+Y.

The term "about" in relation to a numerical value x means, for example, x+10%.

The word "substantially" does not exclude "completely" e.g. a composition which is "substantially free" from Y may be completely free from Y. Where necessary, the word "substantially" may be omitted from the definition of the invention.

As used herein, the term "alkyl" refers to a straight or branched saturated monovalent hydrocarbon radical, having the number of carbon atoms as indicated. By way of non limiting example, suitable alkyl groups include propyl, butyl, pentyl, hexyl, heptyl, octyl, nonyl, decyl, and the like.

EXAMPLES OF THE PRESENT INVENTION

The following examples of the present invention are merely exemplary and should not be viewed as limiting the scope of the invention.

Example 1

An Aerogel according to the invention is produced under the following conditions:

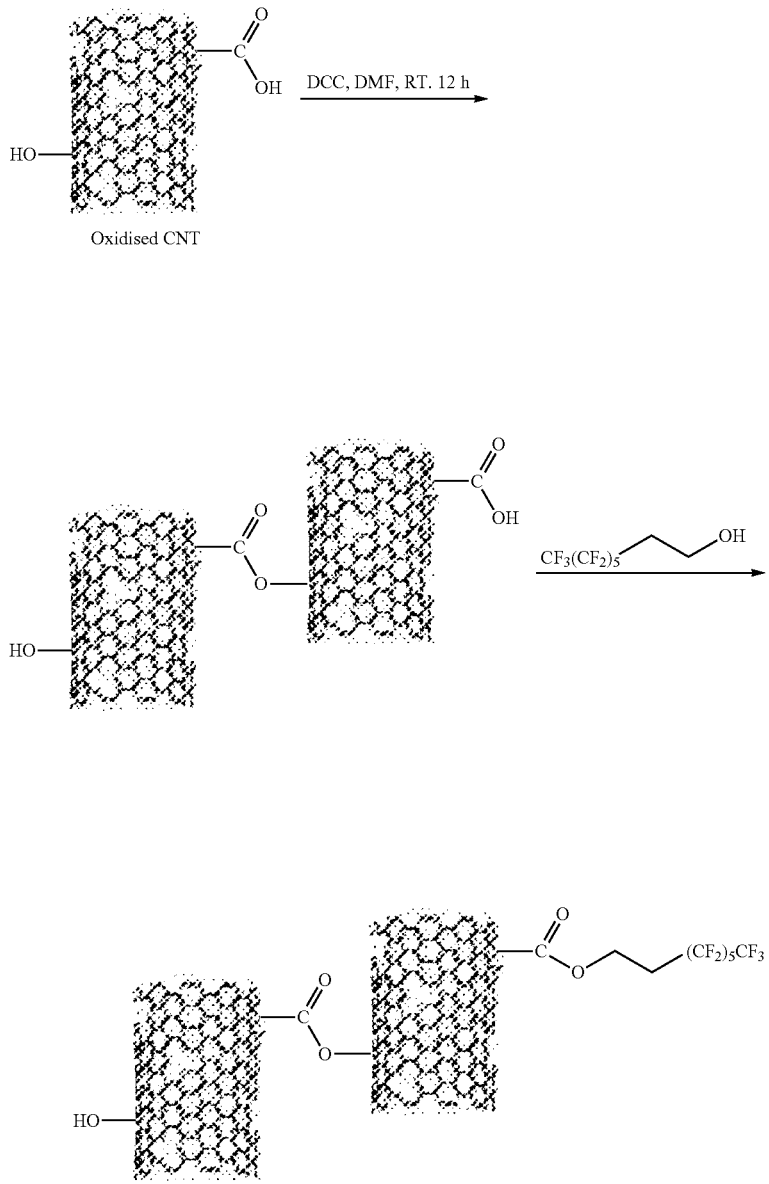

Scheme 1: Reaction scheme

Within the scope of this specific example, multi-walled carbon nanotubes are used (commercial ARKEMA Graphistrength® Multi-Wall Carbon Nanotubes).

Oxidation of the Nanotubes 14 ml of a 3:1 mixture of concentrated sulphuric (95%. AnalaR) and nitric acid (65% AnalaR) were added to 400 mg of these nanotubes. The mixture was stirred and refluxed for 30 min. After cooling, the nanotubes were recovered from the supernatant by filtration using 0.4 μm polycarbonate membranes (HTTP isopore membrane filter, Millipore) and washed with 500 ml of 0.01 M sodium hydroxide (AnalaR). Generally, this 'base-washing' may be an important step to remove oxidation 'debris' and to expose groups directly bound to the nanotubes. The solution was then washed with distilled water until the filtrate reached a neutral pH. In order to remove the water, the sample was suspended in dimethylformamide (ACS, Sigma-Aldrich) and filtrated using 10 μm PTFE membranes (LOW Mitex membrane filter, Millipore). The dimethylformamide washing step was repeated up to 3 times.

Crosslinking of the Nanotubes (gelation)

The resulting sample was placed under nitrogen in a rectangular 10 ml flask sealed with a septum. 1 mL of anhydrous dimethylformamide (99.8% Sigma-Aldrich) was injected-using a syringe and the mixture was sonicated for 1 minute (ultrasonic bath Grant XUB5, 22.2 W/l) in order to obtain a homogeneous dimethylformamide nanotube suspension. To this, 688 mg (10% carbon mol) of 1,3-dicyclohexylcarbodiimide (DCC, Fluka) was added to catalyse the esterification reaction between the alcohols and acid groups of the as-prepared oxidised nanotubes. After 12 hours the black phase—presumably composed by crosslinked nanotubes—was highly viscous and did not deform even when the flask was turned upside down. The volume fraction of the nanotubes in the gel is estimated to be 20%.

Preparation of Hydrophobic Nanotubes

In order to avoid the collapse of the gel during the drying of the solvent, the contact angle between the solvent and the nanotubes was increased by introducing hydrophobic functional groups onto the nanotube surface. This hydrophobisation was achieved through an additional esterification with a fluorinated alcohol; specifically, 0.8 ml (33% carbon mol) of 2,2,2-trifluoroethanol (ReagentPlus, ≥99% Sigma-Aldrich) was added to the gel. After 12 hours the supernatant was set aside. In order to wash the sample, 2 ml of dimethylformamide were added to the gel and after 5 minutes the supernatant set aside. The washing step was repeated up to 3 times.

Exchange the Pore Fluid With a Selected Solvent

The objective in this case is to exchange the pore fluid with the more hydrophobic n-hexane to reduce the effective surface tension during the drying of the gel. Since dimethylformamide and n-hexane are immiscible, acetone is used as an intermediate exchange agent as it is completely soluble in both liquids. Solvent exchange of pore-filled dimethylformamide with acetone and subsequently, of acetone with hexane was carried out For this purpose 2 ml of the solvent were added to the gel and after 5 minutes the supernatant was set aside. The same process was repeated 3 times with each solvent.

Production of an Aerogel

The resulting nanotube-hexane gel was recovered with the aid of a spatula and immediately placed in a glass syringe (20 ml volume and 2 mm nozzle diameter). Extrusion of the gel from the syringe produced a long (up to 10 cm) cylindrical sample that supported its own weight in air and retained its shape in hexane (see THE FIGURE). After 15 minutes the resulting 2 mm diameter cylinders were separated with tweezers, taken out from hexane and dried at room temperature. No shrinkage was observed during the drying of these carbon nanotube based cylindrical Aerogels which had a density of 0.3 g/cm$^3$.

Products

The shape of the Aerogel can be modulated by controlling the shape of the vessel during the gelation step. The density of the final Aerogel can be modulated by varying the volume fraction of nanotubes within the gel. For example, between at least the 20 vol % value described in the specific example and the percolation threshold of these specific crosslinked nanotubes in dimethylformamide (estimated to be around 1 vol %).

The invention claimed is:

1. An aerogel or xerogel having a covalently cross-linked carbon nanotube network comprising: carbon nanotubes, a solvent, and a linking molecule selected from group consisting of bis(diazonium) salts, multifunctional molecules suitable for 1,3-dipolar cycloadditions or Bingel condensations, electrophilic cross-linking molecules, and combinations thereof, wherein the solvent is in an amount that is less than 10% by weight.

2. The aerogel or xerogel according to claim 1, wherein the solvent is selected from the group consisting of dimethyl formamide, benzene, dichloromethane, chlorobenzene, chloroform, toluene, xylene, dioxane, dimethylsulfoxide, thetrahydrofuran, amide solvents, and mixtures thereof.

3. The aerogel or xerogel according to claim 1, wherein the carbon nanotubes are multi-walled carbon nanotubes.

4. The aerogel or xerogel according to claim 3, wherein the multi-walled carbon nanotubes having 5 to 15 walls.

5. The aerogel or xerogel according to claim 1, wherein an aspect ratio of the carbon nanotubes ranges from 100 to 10,000.

6. The aerogel or xerogel according to claim 1, wherein an amount of impurities present in the carbon nanotube network is less than 5% by weight.

7. The aerogel or xerogel according to claim 1, wherein the aerogel or xerogel has a density ranging from 15 to 300 mg/cm$^3$.

8. A catalyst comprising the aerogel or xerogel according to claim 1.

9. A catalyst support comprising the aerogel or xerogel according to claim 1.

10. A non-reflective panel comprising the aerogel or xerogel according to claim 1.

11. An electrode for an electrochemical device comprising the aerogel or xerogel according to claim 1.

12. A filter material comprising the aerogel or xerogel according to claim 1.

13. A gas adsorption medium comprising the aerogel or xerogel according to claim 1.

14. A water purification medium comprising the aerogel or xerogel according to claim 1.

15. An absorbent comprising the aerogel or xerogel according to claim 1.

* * * * *